Patented Oct. 3, 1944

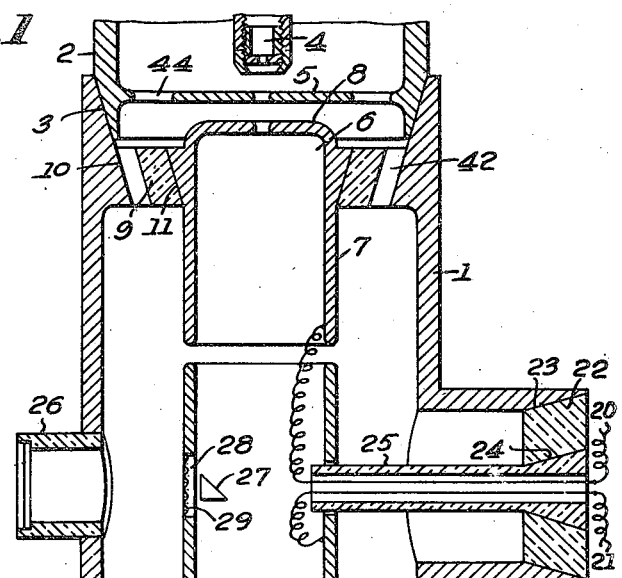
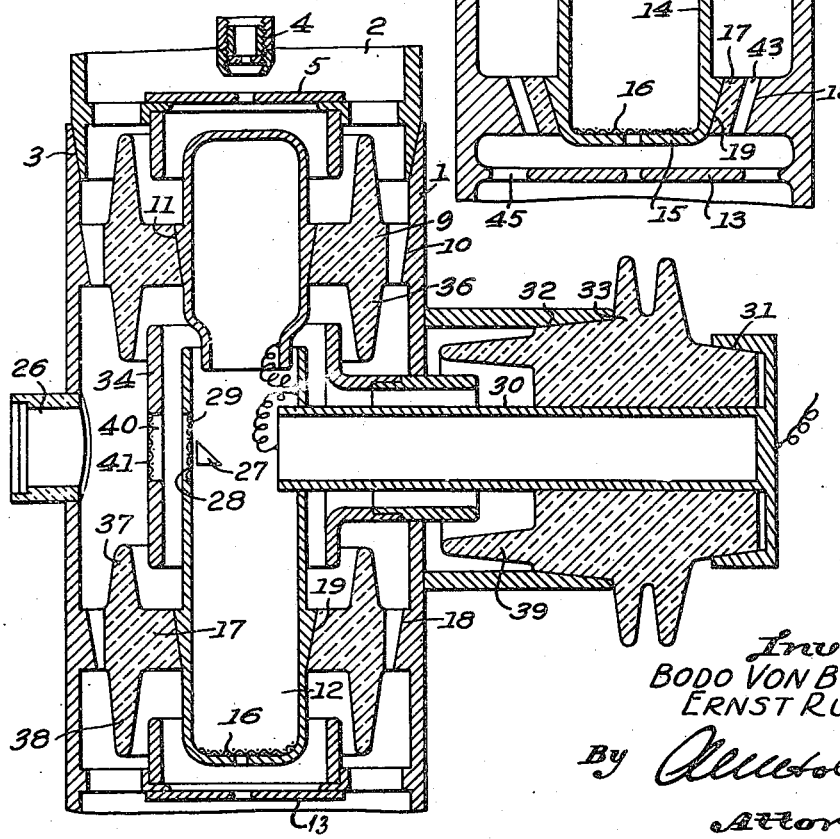

2,359,290

UNITED STATES PATENT OFFICE 2,359,290

ELECTROSTATIC LENS FOR CORPUSCULAR RAY APPARATUS

Bodo von Borries and Ernst Ruska, Berlin-Spandau, Germany; vested in the Alien Property Custodian Application September 11, 1940, Serial No. 356,260
In Germany August 5, 1939

13 Claims. (Cl. 250—49.5)

This invention relates to electron-optical apparatus, such as electronic microscopes, and more particularly to apparatus with electronic lenses of the electrostatic type.

The electron-optical lenses of such apparatus serve to deflect a corpuscular beam, modified by an object to be studied, so as to obtain a magnified image of the object. Electrostatic lenses for this purpose consist, as a rule, of two electrodes which have a central aperture for the passage of the beam and between which a potential difference is maintained in order to create an electrostatic field.

To obtain a symmetrical form of the electric fields, which is the first prerequisite of a faultless lens, it is necessary to center the two lens electrodes very accurately with respect to each other. On the other hand, the lenses must permit being assembled with the microscope vessel and, preferably, should also permit replacing their electrodes. The electric lens fields must also be protected from being disturbed or distorted by such influences as are effected by asymmetrical high-voltage supply leads. There are also exacting requirements as to the necessary high-voltage insulations of the lens electrodes.

The present invention aims at eliminating or reducing these difficulties. More particularly, an object of the invention is to provide an electron-optical apparatus with an electrostatical lens structure which combines an accurate optical design and adjustment with the possibility of dismounting and replacing the lenses or individual parts thereof. Another object is to improve the insulating members necessary in electron-optical apparatus for insulating the lens electrodes from one another and from other conductive parts of the apparatus. These and other objects of the invention will become apparent from the following description.

According to the invention in one of its aspects, each electrostatic lens has a pair of centrally apertured electrodes, one of which is mounted on the vacuum vessel surrounding the path of the irradiating corpuscular beam of the microscope while the other electrode is secured to an insulating carrier of annular shape which has a concentric conical sealing surface engaging a corresponding seat surface of the vacuum vessel. In this manner a properly centered mechanically fixed electrostatic lens is obtained. The arrangement may be so designed that the lenses withstand a high voltage and that electrodes of any shape may be selectively exchanged for one another. The use of conical contact surfaces ensures that the electrodes are brought into correct alignment when replacing the same. The arrangement is, for instance, so designed that the one electrode is integral with the conductive and grounded outer wall of the apparatus so as to be impressed with earth potential while a high voltage is supplied to the other electrode.

The insulating carrier is preferably provided with a conical bore in which fits a corresponding outer cone of the lens electrode impressed with a high voltage. According to another feature of the invention, the electrodes consist of an electrode diaphragm proper and of a tubular part concentric to the axis of the corpuscular beam. According to the further invention, the insulating electrode carrier is given such a form that it projects axially into a space free of electrostatic fields formed between the outer wall of the apparatus and the lens electrode impressed with the same potential. As a result, no electric lines of force pass from one electrode to the other which run tangentially to the surface of the insulator without passing through the latter. Discharges which otherwise occur at high voltages are thus avoided.

The invention may particularly be employed for the objective lens and projection lens of an electronic microscope. In this case the invention, according to another aspect, affords a considerable constructive simplification by employing for the two lenses one and the same high-voltage bushing. In this embodiment, the electrodes of both lenses impressed with a high voltage are preferably so arranged as to face each other.

In order to facilitate assembling and dismantling the electronic microscope and to replace the individual lens parts as quickly as possible, the individual electrodes and the insulating carriers are preferably so dimensioned that the entire lens system can be placed in the vacuum tube from one side, for instance, from the side of the irradiating source. In this case, the vacuum tube is made of two pieces which are joined together, for instance, at the point where the objective lens is arranged, and which have conical sealing surfaces in engagement with each other.

Further details of the invention will be apparent from the following description taken in connection with the acompanying drawing in which Fig. 1 shows part of an electronic microscope provided with two electric magnifying lenses, while Fig. 2 shows another embodiment of such a microscope, both figures representing longitudinal sections along the optical axis of the microscope.

In Fig. 1, 1 denotes the middle portion of the outer vacuum wall of the electronic microscope. The wall 1 consists of conductive material and is grounded. A second conductive vessel portion, designated by 2, is mounted on top of the vessel portion 1. Both portions have conical sealing surfaces, respectively, which engage each other and form a vacuum-tight joint at 3. The cathode (not shown) and an object holder 4 are firmly secured to the part 2. The beam of electrons coming from above traverses the object at 4 and thence passes through the magnifying lens system presently to be described whereby it is caused to produce a magnified image of the object on a screen or photographic plate (both not shown) arranged beneath the vessel portion 1.

The magnifying lens system comprises an objective lens and a projection lens. The objective lens consists of two electrodes 5 and 6. The electrode 5 is impressed with earth potential and is integral with the vacuum wall 2. The electrode 6 has a cylindrical part 7 concentric to the axis of the electron beam and an electrode diaphragm 8 lying perpendicularly to the beam axis. To support the electrode 6 against the vacuum wall 1, an insulating carrier 9 is employed. 10 and 11 denote conical surfaces of the vacuum wall 1 and the insulator 9, and of the insulator 9 and the electrode 7 respectively.

The projection lens consists of an electrode 12 impressed with a high voltage and of a grounded electrode 13. The electrode 13 is integral with the vacuum wall 1. The electrode 12 is also provided with a tubular part 14 lying concentrically to the axis of the beam and with a diaphragm 15 lying perpendicularly to the axis. The electrode diaphragm carries on its inner side a luminous screen 16 on which appears the intermediate image of the object produced by the objective lens. To support the electrode 12 against the vacuum wall 1 an insulating carrier 17 is employed having corresponding conical contact surfaces 18 and 19. The insulators 9 and 17 are provided at their outer periphery with recesses 42 and 43 respectively opposite to which are arranged openings 44 and 45 respectively provided in the parts 5 and 13. In this manner the evacuation of the microscope vessel is facilitated and a uniform pressure along the beam path ensured. The outer diameter of carrier 17 is smaller than that of carrier 9.

The high voltage is supplied to the electrodes 6 and 12 by a common bushing. In the embodiment shown, the electrodes 6 and 12 are impressed with different voltages. The current is supplied to the electrode 6 and electrode 12 by separate conductors 20 and 21 so as to permit controlling both lenses independently of one another. In this case, the voltage difference between electrodes 6 and 12 is small as compared with the voltages of electrodes 6 and 12 with respect to the tube 1. 22 denotes an intermediate insulator whose conical contact surfaces 23 and 24 are in engagement with the outer wall 1 and the insulating insert 25 of the bushing.

An inspection window 26 arranged in the vacuum wall 1 and a prism 27 arranged inside the electrode 12 permit observing the intermediate image on screen 16. In order to prevent a disturbance of the lens field, a wire net 29 is arranged in front of the opening 28 provided in the cylindric part 14 of the electrode 12.

The microscope is assembled in the following manner: Vessel portions 1 and 2 being separated from each other, the insulator 17 is first placed into the vessel portion 1. Then the electrode 12 is inserted and the parts 22 and 25 are assembled with the vessel. The insulator 9 and the electrode 6 are then positioned in the microscope. The upper part 2 of the electronic microscope is hereafter placed on the upper end of the vacuum tube 1.

While the arrangement shown in Fig. 1 is satisfactory for microscopes whose lens voltages are not too high, it is advisable to employ a different arrangement for microscopes for very high voltages. An embodiment for electronic microscopes operating with such high voltages is shown in Fig. 2, in which the same characters as in Fig. 1 are used for denoting similar parts. In Fig. 2, 33 denotes an insulator which serves to insulate the high-voltage bushing 30 against the grounded outer jacket 1 of the apparatus. The conical contact surfaces 31 and 32 serve to join and seal the insulator and the bushing 30. In this embodiment the two electrodes 6 and 12 of both lenses are impressed with the same voltage. To attain a uniform distribution of the electric field a conductive body 34 is arranged within the apparatus so as to surround the cylindrical portions of the inner lens electrodes. The body 34 is mounted on vessel portion 1 and hence kept on earth potential. As a result, a space free of electric fields is established between the grounded body 34 and the grounded wall of vessel portion 1. This space lies intermediate the two field-free spaces existing between the cylindric parts of the lens electrodes 5 and 13 and the vessel wall. The insulating carriers 9 and 17 are provided with annular skirt-like projections 35, 36, 37 and 38 which extend into the field-free spaces so that disturbing discharges are safely prevented. Also the insulator 33 for the high-voltage bushing is provided with a corresponding annular extension 39 ending in the field-free space between the body 34 and the vessel. In the body 34 is arranged an inspection opening 28 provided with a wire net 41. Also in this embodiment the dimensions of the insulating parts (insulators, electrons and other inserts) are preferably so chosen that the parts may be mounted in the apparatus one after the other before placing the upper part 2 of the microscope on the vacuum tube 1.

In the microscope shown in Fig. 2, the grounded electrodes 5 and 13 are laterally displaceable relative to the vessel portion 1. Consequently, the electrodes can be subsequently centered in an accurate manner. The devices (not shown) for adjusting these electrodes may be so designed that the adustment can also be effected during the operation of the microscope. This is advisable particularly in the case of the electrode 5 facing the object to be magnified.

What is claimed is:

1. In an electron-optical apparatus having a conductive vessel enclosing the path of a corpuscular beam an electrostatic lens comprising two electrodes spaced along said path, said electrodes having a central opening and being rotationally symmetrical with respect to the axis of said path, one of said electrodes being connected with said vessel so as to have the potential of the vessel and an annular insulating carrier removably secured to said vessel and forming a conical joint therewith, and said other electrode being mounted on said carrier to be impressed with a potential different from that of said vessel, said second electrode and said carrier having conical seat surfaces engaging each other and concentric to said axis.

2. In an electron-optical apparatus having a conductive vessel enclosing the path of a corpuscular beam, an electrostatic lens comprising two electrodes spaced along said path, said electrodes having a central opening and being rotationally symmetrical with respect to the axis of said path, one of said electrodes being integral with said vessel, and an insulating carrier removably secured to said vessel and forming therewith a conical joint coaxial with said path, said other electrode being mounted on said carrier and forming therewith a conical joint coaxial with said path.

3. In an electron-optical apparatus having a conductive and grounded vacuum vessel enclosing the path of a corpuscular beam and comprising a tubular vessel portion, said vessel portion having an interior conical seat surface concentric to said path, an annular insulating carrier having a conical surface engaging said seat surface, an electrostatic lens comprising two centrally apertured electrodes spaced from each other along said path and being rotationally symmetrical to the axis of said path, one of said electrodes being mounted on said vessel so as to be displaceable transversely to said axis, said other electrode having a conical peripheral surface engaging said conical surface of said insulating carrier.

4. In an electron-optical apparatus having a conductive vessel portion surrounding the path of a corpuscular beam, an electrostatic lens structure comprising two electrodes spaced from each other along said path, said electrodes having a central opening and being rotationally symmetrical with respect to the axis of said path, one of said electrodes being secured to said vessel portion so as to have the same potential, said electrode having a cylindrical portion extending concentrically to said axis to produce a space substantially free of electrostatic fields between said cylindrical portion and said vessel portion, an insulating carrier of annular shape mounted on said vessel portion and having one frontal end located in said field-free space, said other electrode being mounted on said insulating carrier.

5. An electronic microscope having a vacuum vessel enclosing the path of a corpuscular beam, an objective lens and a projection lens for causing said beam to produce an intermediate image and to magnify said image respectively, each of said lenses comprising a pair of centrally apertured electrodes insulated from each other and arranged rotationally symmetrical to the axis of said path, a luminescent screen disposed on the surface of the electrode of said projection lens facing said objective lens, and a lateral observation window in the wall of said vessel for observing the intermediate image appearing on said screen.

6. An electronic microscope having means for holding an object, a projection lens for producing an intermediate image of the object, a projection lens for magnifying part of the intermediate image comprising a centrally apertured lens member, and luminescent screen means disposed on the surface of said lens member facing said objective lens for visualizing the intermediate image.

7. An electron microscope having means for holding an object, an objective lens for producing an intermediate image of the object, a projection lens for magnifying part of the intermediate image, said projection lens being of the electrostatic type and comprising two centrally apertured electrodes rotationally symmetrical to the optical axis and spaced from each other along said axis, luminescent means disposed on the electrode of said projection lens facing said objective lens for visualizing the intermediate image, a light-optical prism arranged between said lenses to permit observing said image from the outside of the microscope.

8. An electronic microscope having a vacuum vessel enclosing the path of a corpuscular beam and having two inner peripheral seat surfaces of conical shape, an objective lens for producing an intermediate image of an object, and a projection lens for magnifying said image, each of said lenses comprising a pair of centrally apertured electrodes spaced from each other along said path and disposed rotationally symmetrical to the axis of the path, each of said lenses having its one electrode facing the other lens provided with a tubular portion extending towards the tubular portion of the corresponding electrode of the other lens, said tubular portions being concentric to said axis and covering substantially the whole section of said path between the electric fields of said lenses, and each of said two electrodes having a tubular portion forming a conical seat surface also concentric to said axis, two insulating annular carriers having each an outer conical surface engaging one of said conical seat surfaces of said vacuum vessel, said tubular electrode portions being mounted on said carriers respectively so as to have their seat surfaces engage the conical inner surfaces of said carriers respectively.

9. An electronic microscope having a conductive vacuum vessel surrounding the path of a corpuscular beam, an objective lens for producing an intermediate image of an object, and a projection lens for magnifying said image, each of said lenses comprising a pair of centrally apertured electrodes spaced from each other along said path and disposed rotationally symmetrical to the axis of the path, each of said lenses having the outer electrode mounted on and conductively connected with said vessel, an insulating annular carrier provided for each lens and removably arranged in said vessel so as to form therewith a conical joint concentric to said axis, the inner electrodes of said lenses being mounted on said carriers respectively, said vessel having a lateral bushing arranged between said lenses, and conductor means traversing said bushing and connected with said inner electrodes for impressing them with a high potential as compared with that of said vessel and said outer electrodes.

10. An electronic microscope having a conductive vessel portion surrounding the path of a corpuscular beam, an electrostatical lens in said vessel portion for producing an image of an object, said lens having two centrally apertured electrodes spaced from each other along said path, an annular insulating carrier mounted on said vessel portion, one of said electrodes being mounted on said carrier, conductor means traversing said bushing and connected with said electrode on said carrier to impress said electrode with a high potential as compared with that of said vessel portion, a conductive screening cylinder connected with said vessel portion and extending around a portion of said beam path near said latter electrode so as to establish an annular space free of electric fields between said cylinder and said vessel portion, said insulating carrier having a skirt-like portion projecting into said field-free space.

11. In an electron-optical apparatus having a conductive vessel portion surrounding the path of a corpuscular beam, an electrostatic lens structure comprising two electrodes spaced from each other along said path, said electrodes having a central opening and being rotationally symmetrical with respect to the axis of said path, one of said electrodes being secured to said vessel portion so as to have the same potential, said electrode having a cylindrical portion extending concentrically to said axis to produce a space substantially free of electrostatic fields between said cylindrical portion and said vessel portion, conductor means connected with the other electrode for supplying a high voltage, a conductive screening cylinder connected with said vessel portion and extending around a portion of said beam path near said latter electrode so as to establish a second field-free space between said cylinder and said vessel portion, and an insulating annular carrier mounted on said vessel portion and carrying said latter electrode, said carrier forming two skirt-like projections ending in said two field-free spaces respectively.

12. An electronic microscope having a vacuum vessel enclosing the path of a corpuscular beam, an objective lens and a projection lens for causing said beam to produce an intermediate image and to magnify said image respectively, each of said lenses comprising a pair of centrally apertures electrodes spaced from each other along said path and rotationally symmetrical to the optical axis of said path, the inner electrodes of said lenses having concentric cylindrical portions respectively projecting towards each other, the outer electrodes of said lenses being connected with said vessel and having each a cylindrical portion projecting towards the appertaining inner electrode so as to establish a space free of electric fields between each of said latter cylindrical portions and the surrounding wall portion of said vessel, a conductive screening cylinder connected with said vessel and surrounding said projecting cylindrical portions of said inner electrodes so as to form between said screening cylinder and said vessel a third field-free space located intermediate said two first-mentioned field-free spaces, and two insulating carriers of annular shape arranged between said vessels and said inner electrodes respectively and carrying said latter electrodes, each of said insulating carriers having two oppositely located concentric projections of skirt-like shape ending in said intermediate field-free space and in one of said other field-free spaces respectively.

13. In an electronic microscope having a vacuum vessel, two coaxial electrostatic magnifying lenses disposed in said vessel and spaced from each other along their common axis, said lenses comprising each a pair of centrally apertured len diaphragms, the diaphragm of one lens facing the other lens being provided with a conductive cylinder projecting towards the other lens concentrically to said axis, a centrally apertured luminescent screen arranged between said lenses to indicate an intermediate image produced by one of said lenses, said cylinder having a lateral opening, and light-deflecting means arranged within said cylinder to permit observing said screen through said opening.

BODO von BORRIES.
ERNST RUSKA.